(12) United States Patent
Kazuo

(10) Patent No.: US 10,921,549 B2
(45) Date of Patent: Feb. 16, 2021

(54) OPTICAL DEVICE, CAMERA AND PORTABLE ELECTRONIC DEVICE

(71) Applicant: AAC Optics Solutions Pte. Ltd., Singapore (SG)

(72) Inventor: Shikama Kazuo, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 0 days.

(21) Appl. No.: 16/719,928

(22) Filed: Dec. 18, 2019

(65) Prior Publication Data

US 2020/0249426 A1 Aug. 6, 2020

(30) Foreign Application Priority Data

Jan. 31, 2019 (JP) .............................. JP2019-015699

(51) Int. Cl.
*G02B 7/10* (2021.01)
*G03B 3/10* (2021.01)
*H04N 5/225* (2006.01)

(52) U.S. Cl.
CPC ............... *G02B 7/10* (2013.01); *G03B 3/10* (2013.01); *H04N 5/2253* (2013.01); *H04N 5/2254* (2013.01); *G03B 2205/0069* (2013.01)

(58) Field of Classification Search
None
See application file for complete search history.

(56) References Cited

U.S. PATENT DOCUMENTS

| | | | | |
|---|---|---|---|---|
| 6,278,844 B1 * | 8/2001 | Takeshita | ................. | G02B 7/10 |
| | | | | 359/696 |
| 9,807,312 B1 * | 10/2017 | Kim | ........................ | H04N 5/238 |
| 2018/0341166 A1 * | 11/2018 | Imai | .......................... | G03B 9/10 |
| 2018/0356283 A1 * | 12/2018 | Shikama | ................ | G03B 17/02 |
| 2019/0137844 A1 * | 5/2019 | Park | .......................... | G03B 9/06 |
| 2020/0241235 A1 * | 7/2020 | Kazuo | .................. | G02B 27/646 |
| 2020/0249426 A1 * | 8/2020 | Kazuo | .................. | H04N 5/2253 |
| 2020/0310148 A1 * | 10/2020 | Chiu | .................. | H04N 5/23248 |

* cited by examiner

*Primary Examiner* — William B Perkey
(74) *Attorney, Agent, or Firm* — W&G Law Group LLP

(57) ABSTRACT

A blade driving device includes: one or more blades; a base part for supporting the blade and to which an attraction magnet is fixed; a rod part rotatably and axially supported by the base part and including a connection portion connected to the blade; a rotation part rotatably and axially supported by the base part and including a connection portion connected to the rod part; a driving magnet-iron including magnet pole surfaces of different polarities fixed to the rotation part; and a coil wound around one of the magnet pole surfaces. The blade drive device includes a power supply terminal for supplying power from the wound coil to an external component, so as to supply power from a connection terminal provided at the connection line fixing base and connected to an external component via a spring leaf arranged on the lens driving device.

10 Claims, 4 Drawing Sheets

OPTICAL DEVICE, CAMERA AND PORTABLE ELECTRONIC DEVICE

TECHNICAL FIELD

The present disclosure related to an optical device, a camera and a portable electronic device.

BACKGROUND

With rapid development of photography technologies, blade driving devices and lens driving devices have been widely used in large number of photographic devices. Application of the lens driving device in various portable electronic devices, such as mobile phones, tablet computers, etc., has been especially accepted by consumers.

A blade driving device drives one or more blades to change a state of an opening, and is used as a shutter, an aperture, a diaphragm shutter, a filter, and the like for various optical units such as a camera. A lens driving device drives the lens holder in such a manner that a lens holder moves along an optical axis direction of a lens, thereby achieving focusing. By allowing the lens holder to move in a direction perpendicular to the optical axis direction of the lens, image shake caused by hand shake then can be corrected. However, with the lens driving device, the lens holder moves in the optical axis direction for focusing and moves in the direction perpendicular to the optical axis direction for correcting the image shake, and since the aperture or the shutter is required to appropriately block light at a given position of the lens, it is necessary to make the aperture and shutter move together with the lens. The conventional fixed aperture and shutter cannot properly perform light amount adjustment by movement of the lens driving device, or even for a mobile aperture or shutter, a trace mechanism for supplying power may hinder an action of the lens driving device. In addition, since a driving portion of the blade driving device changes a center of gravity of the lens driving device, it may not perform appropriate lens driving.

Therefore, it is needed to provide a new blade driving device and lens driving device that can solve the above problems.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

Figure 1:
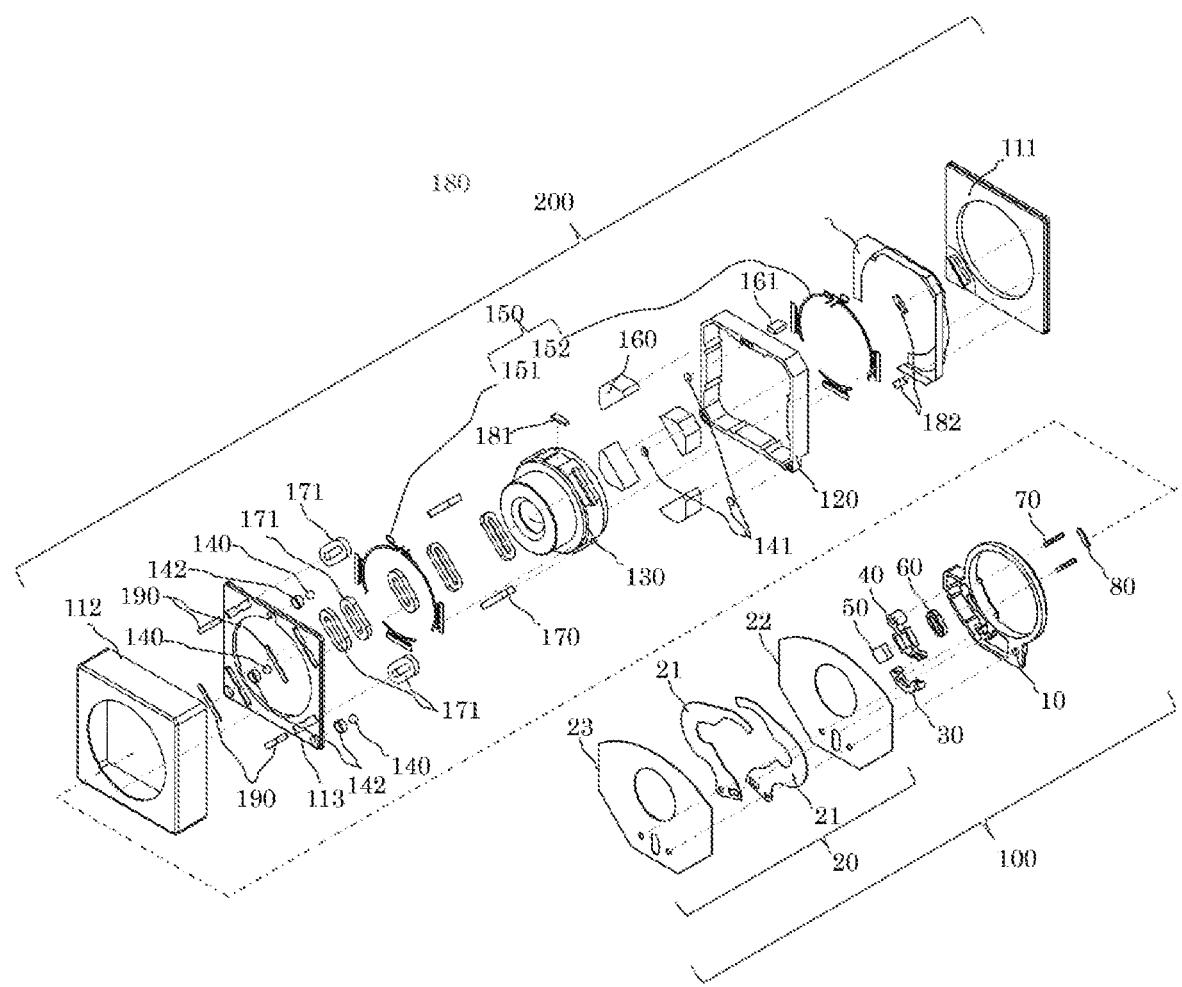
FIG. 1 is an exploded perspective view of a blade driving device and a lens driving device according to the present disclosure.
Figure 2:
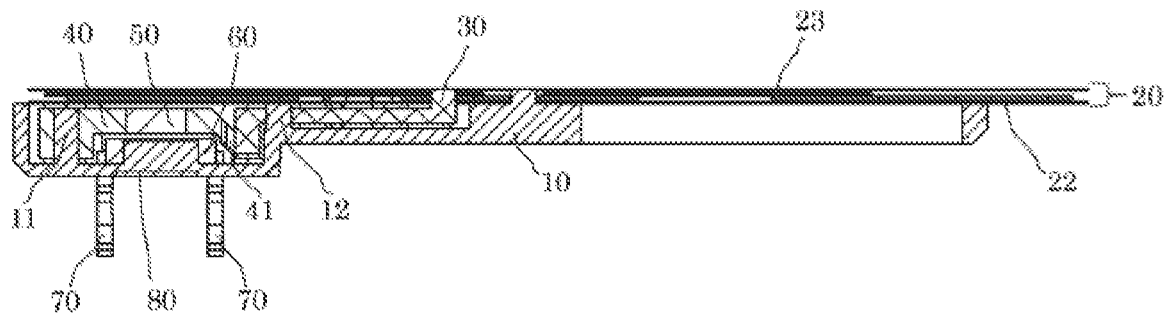
FIG. 2 is a cross-sectional view of a blade driving device according to the present disclosure.
Figure 3:
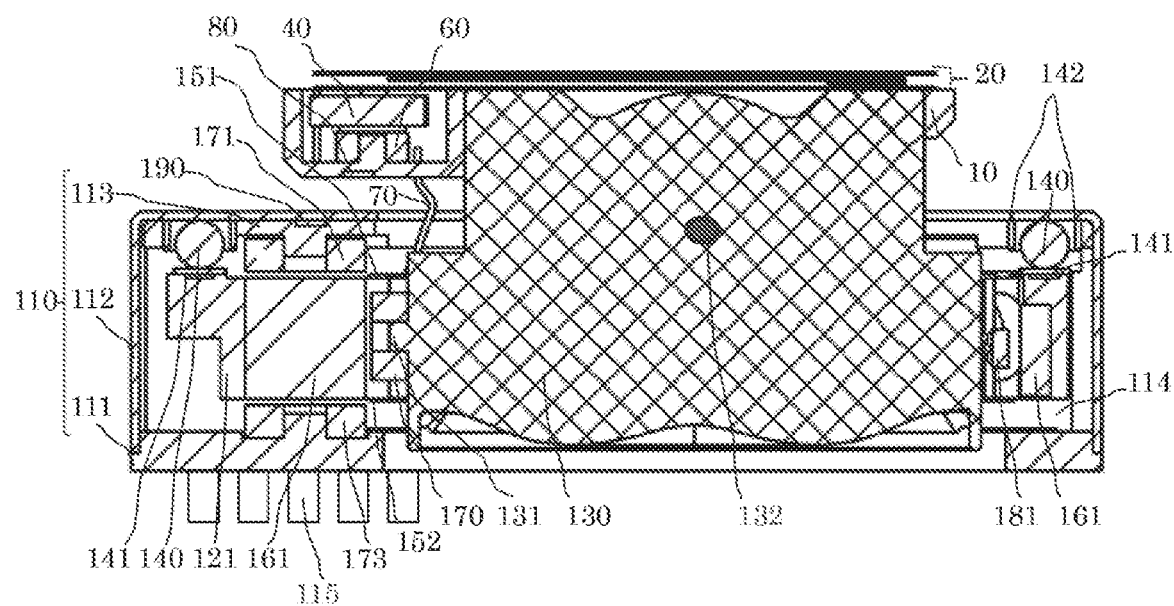
FIG. 3 is a cross-sectional view of a blade driving device and a lens driving device according to the present disclosure.
Figure 4:
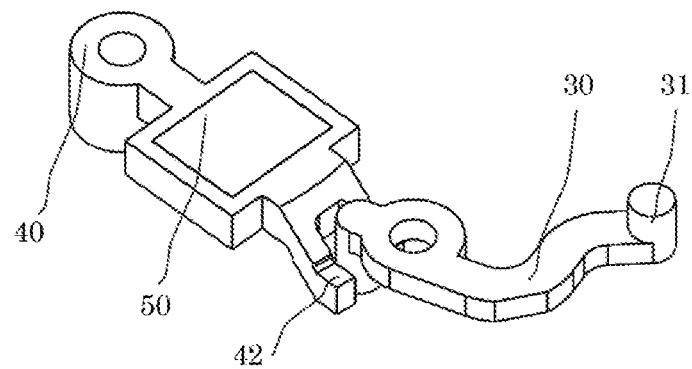
FIG. 4 is a front view of a blade driving device according to the present disclosure.
Figure 5:
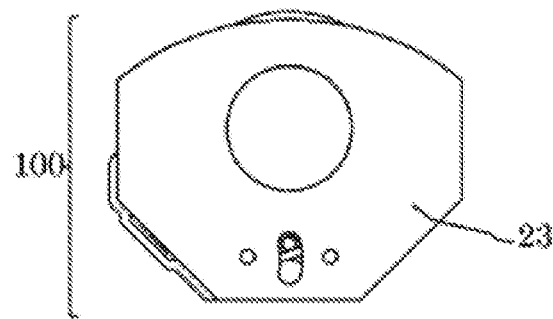
FIG. 5 shows a rod part having a connection portion connected to a blade and a rotation part having a connection portion connected to the rod part according to the present disclosure.
Figure 6:
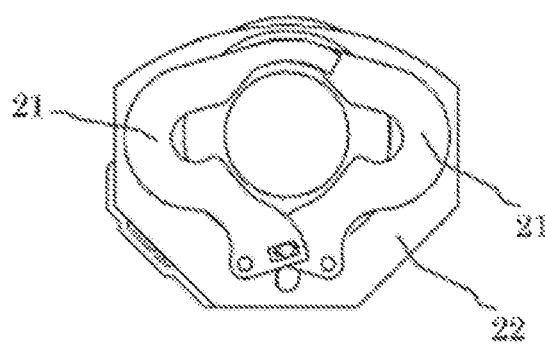
FIG. 6 is a front view of a blade driving device except for a plate part that has an aperture, forms a blade chamber and covers a blade according to the present disclosure.
Figure 7:
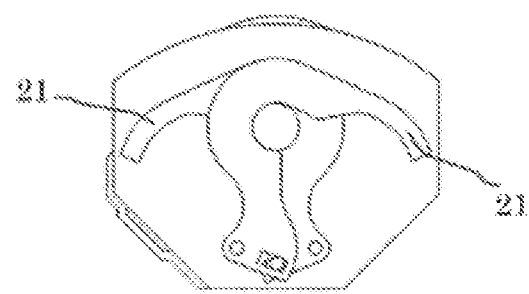
FIG. 7 is a front view of a blade driving device except for a plate part that has an aperture, forms a blade chamber and covers a blade according to the present disclosure, with the blade being closed.
Figure 8:
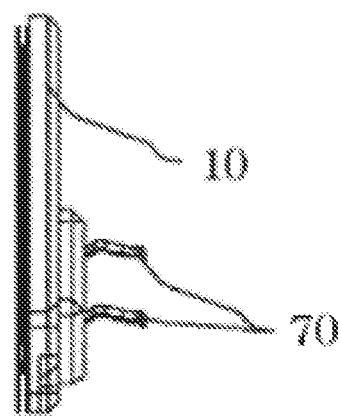
FIG. 8 is a right view of a blade driving device according to the present disclosure.
Figure 9:
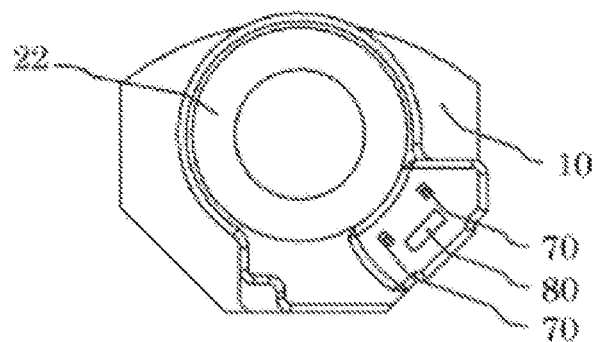
FIG. 9 is a rear view of a blade driving device according to the present disclosure.

Hereinafter, the present disclosure will be described in detail with reference to the accompanying drawings.

FIGS. 1 to 7 are diagrams showing a blade driving device 100 and a lens driving device 200 according to the present disclosure.

The blade driving device 100 includes a base part 10 for supporting a blade; a blade 21; a plate part 22 having an aperture and forming a blade chamber; a plate part 23 having an aperture and forming a blade chamber and covering the blade; a rod part 30 having a connection portion connected to the blade; a rotation part 40 having a connection portion connected to the rod part; a driving magnet-iron 50 having a magnetic pole surface; a wound coil 60; a power supply terminal 70; and an attraction magnet-iron or magnet body 80.

The blade chamber 20 includes: the blade 21; the plate part 22 having the aperture and forming the blade chamber; and the plate part 23 having the aperture, forming the blade chamber and covering the blade.

The blade driving device includes a driving portion, and the driving portion includes: the rod part 30 including the connection portion connected to the blade; the rotation part 40 that includes a connection portion connected to the rod part and to which the driving magnet-iron 50 having the magnet pole surface is mounted; the wound coil 60; the power supply terminal 70; and the attraction magnet-iron or magnet 80.

Under an electromagnetic interaction between the wound coil 60 of the blade driving device and the driving magnet-iron 50 having the magnet pole surface, the rotation part 40 including the connection portion connected to the rod part including a sliding portion 42 being staggered in a height direction rotates with a shaft 11 as a fulcrum, and the rod part 30 including the connection portion connected to the blade and being connected to the connection portion 41 rotates with a shaft 12 as a fulcrum, so that the connected blade 21 can be open and closed. Here, the shaft 11 supports the rotation part comprising the connection portion connected to the rod part, and the shaft 12 supports the rod part comprising the connection portion connected to the blade.

The lens driving device 200 includes a case 110, a lens module 130, a support frame 120, a spring leaf 150, a support part 140, a magnet steel 160, a first driving coil 170, and a second driving coil 171.

The case 110 has a receiving space 114, and the case 110 includes: a fixing base 113; a cover 112 for defining the receiving space 114 with the fixing base 113; and a connection line fixing base 111 for fixing a connection line 180.

The fixing base 113 is provided with a cylindrical holding part 142 and a second driving coil 171 fixed to the fixing base 113.

The support frame 120 is received in the receiving space 114 of the case 110, the lens module 130 is received in the support frame 120, and the lens module 130 includes a lens (not shown).

The support part 140 supports the support frame 120 and the fixing base 113 in such a manner that the support frame 120 can freely move relative to the fixing base 113 in a direction orthogonal to an optical axis of the lens.

The support part 140 may be a ball. At least three balls 140 can be provided, and correspondingly a ball receiving surface 141, on which the balls 140 is to be placed, is arranged at an upper portion of the support frame 120. Rolling of the balls 140 enables the support frame 120 to freely move relative to the fixing base 113 in the direction orthogonal to the optical axis of the lens.

The spring leaf 150 connects the lens module 130 with the support frame 120.

The spring leaf 150 includes an upper spring leaf 151 and a lower spring leaf 152 that are respectively arranged on an upper surface portion and a lower surface portion of the lens module 130 along the optical axis direction of the lens.

The magnet steel 160 is mounted and fixed to the support frame 120.

The lens driving device 200 is provided with a magnet yoke 190, and the magnet yoke 190 is mounted and fixed to the fixing base 113, and has functions of pulling the magnet steel 160 towards the optical axis direction and pulling the lens module towards a center of the optical axis when the lens module moves in a direction perpendicular to the optical axis direction.

The first driving coil 170 is mounted and fixed to the lens module 130 and is opposite to the magnet steel 160.

The lens module 130 is provided with a protrusion 131 extending in a direction facing away from a center of the lens module. The first driving coil 170 is held at the protrusion 131.

The first driving coil 170 is opposite to the magnet steel 160. Under an electromagnetic interaction between the first driving coil 170 and the magnet steel 160, the lens module can move along the optical axis direction of the lens, thereby achieving focusing.

The second driving coil 171 is arranged at the fixing base 113 and is arranged correspondingly to an upper portion of the magnet steel 160.

The second driving coil 171 can be a coil winding that is mounted and fixed on the fixing base 113, or can be a conductive pattern directly formed on the fixing base 113. Under an electromagnetic interaction between the second driving coil 171 and the magnet steel 160, the support frame 120 can move relative to the fixing base 113 in the direction orthogonal to the optical axis of the lens, thereby achieving adjustment relating to movement of the optical axis of the lens.

In an embodiment, four first driving coils 170 can be provided. It should be noted that providing four first driving coils 170 is merely an embodiment for allowing those skilled in the art to completely understand the present disclosure, and the present disclosure is not limited to the embodiment in which the number of the first driving coils 170 is four.

Corresponding to the four first driving coils 170, upper spring leaves 151 are arranged together with the four first driving coils 170 to be centrosymmetric with respect to a center line parallel with the optical axis of the lens, i.e., being arranged at positions symmetrical with respect to the center line.

The lens driving device 200 is further provided with a connection line 180.

The connection line 180 is connected to the spring leaf 150. Each first driving coil 170 includes an end having a line end connected to a corresponding upper spring leaf 151, and another end having a line end connected to the lower spring leaf 152. Alternatively, a magnetism detecting element 181 including a first driving circuit can be connected to the line end of each first driving coil, and then the magnetism detecting element 181 including the first driving circuit is connected to the spring leaf 150 and to the connection line 180.

The magnetism detecting element 181 including the first driving circuit is an example, and it can also be another magnetism detecting element. The magnetism detecting element 181 including the first driving circuit detects magnetism of the magnet steel 160 corresponding to the magnetism detecting element, thereby detecting a position of the lens module 130 moving in the optical axis direction. This can achieve the more efficient adjustment relating to the movement of the lens in the optical axis direction.

In order to handle with a change in a center of gravity of the lens driving device caused by a weight of the magnetism detecting element 181 including the first driving circuit and the corresponding magnet steel 160, the rod part 30 serving as a driving portion of the blade driving device and including the connecting portion connected to the blade, the rotation part 40 including the connection portion connected to the rod part, the driving magnet-iron 50 including the magnet pole surface, the wound coil 60, the power supply terminal 70, and the attraction magnet-iron or the magnet 80 are arranged in quadrants staggered with respect to a plane direction, thereby correcting a center of gravity of the lens when it is being driven.

Similarly, corresponding to the first driving coils 170, four magnet steels 160 and four second driving coils 171 are provided, and the four magnet steels 160 and the four second driving coils 171 are respectively arranged to be centrosymmetric with respect to the center line parallel with the optical axis of the lens, i.e., being respectively arranged at positions symmetrical with respect to the center line.

The second driving coil 171 and a second driving coil auxiliary part 173 are electrically connected to a connection terminal 115, and the connection terminal 115 is provided at the connection line fixing base and connected to an external component. However, the second driving coil 171 and the second driving coil auxiliary part 173 can also be connected to the magnetism detecting element 182 including a second driving circuit. Here, the magnetism detecting element 182 including the second driving circuit is merely an example, and it can also be a driving IC capable of magnetism detection. The magnetism detecting element 182 including the second driving circuit is located at a position corresponding to the magnet steel 160, and can detect a position of the magnet steel 160 moving together with the support frame 120.

When the optical axis of the lens moves or tends to move due to shake, a current can flow into four second driving coils 171 provided nearby a horizontal position of a center of gravity of the lens module or into the second driving coil 171 and the second driving coil auxiliary part 172. Since the second driving coil 171 and the second driving coil auxiliary part are fixed, according to the law of action and reaction, the support frame 120 can on the one hand efficiently keep balance relative to a center of gravity of a moving object and on the other hand move relative to the fixing base 113 along the direction orthogonal to the optical axis of the lens, or can suppress the moving tendency of the optical axis of the lens. Therefore, movement of the optical axis of the lens can be adjusted.

Figure 10:
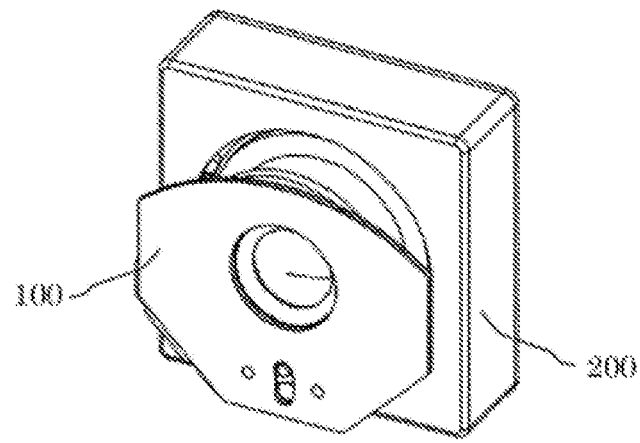
FIG. 10 is a perspective view of a blade driving device and a lens driving device according to the present disclosure.
Figure 11:
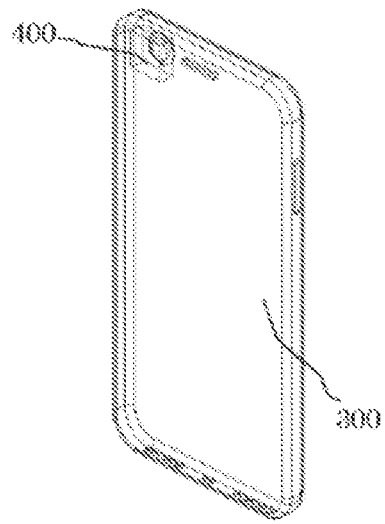
FIG. 11 shows a portable electronic device (portable information terminal) including a blade driving device and a lens driving device according to the present disclosure.

The above-mentioned lens driving device 200 can also be used in a photographic device 400 for use in portable information device 300 such as a so-called smart cellphone, a so-called function cellphone or a tablet device shown in FIG. 10.

With the blade driving device 100 and the lens driving device 200 of the present disclosure, by the movement relative to the optical axis direction of the lens and movement in the direction perpendicular to the optical axis direction, a trace for supplying power to the blade driving device is connected from the power supply terminal 70 via the spring leaf 150 to the connection terminal 115 provided at the connection line fixing base and connected to an external component through the connection line 180, so that the blade 21 can act without additional trace for power supply. By making the power supply terminal 70 spring-like, a simple assembly can be achieved, and the movement in the optical axis direction for focusing and the movement perpendicular to the optical axis direction for correcting image shake can be achieved without hindering an action of the lens. This can achieve an appropriate adjustment of light amount by the blade 21, and improve a quality of the captured image.

The above-described embodiments are merely preferred embodiments of the present disclosure and are not intended to limit the scope of the present disclosure. Any equivalent modification or variation made by those skilled in the art based on the present disclosure is included in the scope of the present disclosure.

REFERENCE SIGNS

10 . . . base part for supporting blade
11 . . . shaft for supporting rotation part including connection portion connected to rod part
12 . . . shaft for supporting rod part including connection portion connected to blade
20 - - - blade chamber
21 . . . blade
22 . . . plate part having aperture and forming blade chamber
23 . . . plate part having aperture and forming blade chamber and covering blade
30 . . . rod part including connection portion connected to blade
31 . . . connection portion connected to blade
40 . . . rotation part including connection portion connected to rod part
41 . . . connection portion connected to rod part
42 . . . sliding portion being staggered in height direction
50 . . . driving magnet-iron including magnet pole surface
60 . . . wound coil
70 . . . power supply terminal
80 . . . attraction magnet-iron or magnet
100 . . . blade driving device
110 . . . case
111 . . . connection line fixing base
112 . . . cover
113 . . . fixing base
114 . . . receiving space
115 . . . connection terminal provided at connection line fixing base and connected to an external component
120 . . . support frame
130 . . . lens module
131 . . . protrusion
132 . . . center of gravity of lens module
140 . . . support part
141 . . . ball receiving surface
142 . . . cylindrical holding part
150 . . . spring leaf
151 . . . upper spring leaf
152 . . . lower spring leaf
160 . . . magnet steel
161 . . . magnet steel corresponding to magnetism detecting element
170 . . . first driving coil
171 . . . second driving coil
172 . . . second driving coil auxiliary part
180 . . . connection line
181 . . . magnetism detecting element including first driving circuit
182 . . . magnetism detecting element including second driving circuit
190 . . . magnet yoke
200 . . . lens driving device
300 . . . portable information device
400 . . . photographic device.

What is claimed is:

1. An optical device, comprising:
a blade driving device; and
a lens driving device comprising a driving member movable in an optical axis direction,
wherein the blade driving device comprises:
  one or more blades;
  a base part for supporting the one or more blades, an attraction magnet-iron or magnet being fixed to the base part;
  a rod part rotatably and axially supported by the base part and comprising a connection portion connected to the one or more blades;
  a rotation part rotatably and axially supported by the base part and comprising a connection portion connected to the rod part;
  a driving magnet-iron comprising magnet pole surfaces of different polarities fixed to the rotation part; and
  a coil wound around one of the magnet pole surfaces and comprising a power supply terminal for supplying power to an external component,
and the lens driving device comprises:
  a lens module comprising a lens barrel for receiving a lens;
  a support frame internally provided with the lens module; and
  a spring leaf connecting the lens module with the support frame, and
wherein the blade driving device is arranged on the lens module of the lens driving device, and the power supply terminal of the blade driving device supplies power via the spring leaf of the lens driving device.

2. The optical device as described in claim 1, wherein the blade driving device comprises a driving portion located at a position where a center of gravity of the lens driving device is corrected.

3. The optical device as described in claim 1, wherein the power supply terminal of the blade driving device is a spring part.

4. The optical device as described in claim 2, wherein the power supply terminal of the blade driving device is a spring part.

5. The optical device as described in claim 1, wherein the rod part comprising the connection portion connected to the one or more blades and the rotation part comprising the connection portion connected to the rod part are located in a same plane, and the rod part further comprises a sliding portion being staggered in a height direction, so as not to interfere with a rotation axis of the rod part.

6. The optical device as described in claim 2, wherein the rod part comprising the connection portion connected to the one or more blades and the rotation part comprising the connection portion connected to the rod part are located in a same plane, and the rod part further comprises a sliding portion being staggered in a height direction, so as not to interfere with a rotation axis of the rod part.

7. The optical device as described in claim 1, wherein the rod part comprising the connection portion connected to the one or more blades and the rotation part comprising the connection portion connected to the rod part are configured to limit a height direction via a plate part, the plate part being configured to separate a blade part of the blade driving device from the base part.

8. The optical device as described in claim 2, wherein the rod part comprising the connection portion connected to the one or more blades and the rotation part comprising the connection portion connected to the rod part are configured to limit a height direction via a plate part, the plate part being configured to separate a blade part of the blade driving device from the base part.

9. A camera, comprising an optical device, the optical device comprising:
a blade driving device; and
a lens driving device comprising a driving member movable in an optical axis direction,
wherein the blade driving device comprises:
one or more blades;
a base part for supporting the one or more blades, an attraction magnet-iron or magnet being fixed to the base part;
a rod part rotatably and axially supported by the base part and comprising a connection portion connected to the one or more blades;
a rotation part rotatably and axially supported by the base part and comprising a connection portion connected to the rod part;
a driving magnet-iron comprising magnet pole surfaces of different polarities fixed to the rotation part; and
a coil wound around one of the magnet pole surfaces and comprising a power supply terminal for supplying power to an external component,
and the lens driving device comprises:
a lens module comprising a lens barrel for receiving a lens;
a support frame internally provided with the lens module; and
a spring leaf connecting the lens module with the support frame, and
wherein the blade driving device is arranged on the lens module of the lens driving device, and the power supply terminal of the blade driving device supplies power via the spring leaf of the lens driving device.

10. A portable electronic device comprising a camera, the camera comprising an optical device, and the optical device comprising:
a blade driving device; and
a lens driving device comprising a driving member movable in an optical axis direction,
wherein the blade driving device comprises:
one or more blades;
a base part for supporting the one or more blades, an attraction magnet-iron or magnet being fixed to the base part;
a rod part rotatably and axially supported by the base part and comprising a connection portion connected to the one or more blades;
a rotation part rotatably and axially supported by the base part and comprising a connection portion connected to the rod part;
a driving magnet-iron comprising magnet pole surfaces of different polarities fixed to the rotation part; and
a coil wound around one of the magnet pole surfaces and comprising a power supply terminal for supplying power to an external component,
and the lens driving device comprises:
a lens module comprising a lens barrel for receiving a lens;
a support frame internally provided with the lens module; and
a spring leaf connecting the lens module with the support frame, and
wherein the blade driving device is arranged on the lens module of the lens driving device, and the power supply terminal of the blade driving device supplies power via the spring leaf of the lens driving device.

* * * * *